Patented May 7, 1929.

1,711,707

UNITED STATES PATENT OFFICE.

LEON R. WESTBROOK, OF CLEVELAND HEIGHTS, OHIO, ASSIGNOR, BY MESNE ASSIGNMENTS, TO THE GRASSELLI CHEMICAL COMPANY, OF CLEVELAND, OHIO, A CORPORATION OF DELAWARE.

PROCESS OF MAKING CRYSTALLIZED, NONCAKING TRISODIUM PHOSPHATE HYDRATE.

No Drawing. Application filed January 27, 1928. Serial No. 250,074.

Trisodium phosphate is usually marketed in the form of the dodecahydrate and every commercial product tested by me was found to contain from small to appreciable amounts of free caustic alkali, i. e., NaOH, in excess of that corresponding to the formula $Na_3PO_4$. The dodecahydrate weathers very easily in the atmosphere, caking into hard and solid lumps which make the handling of this product in small packages quite impractical. This weathering is partly due to the ease with which the dodecahydrate loses some of its crystal water in dry air and recrystallizes under moist conditions, and partly also to the free caustic content which carbonates in contact with the atmosphere, producing rough, uneven crystal surfaces which are ideal for the interlocking and formation of solid crystal aggregates.

Trisodium phosphate decahydrate, on the other hand, is described as being practically stable under usual, normal atmospheric conditions, and I found this entirely confirmed by my own tests which showed this decahydrate to be practically non-caking. I further found that crystallized decahydrate can be obtained easily free from any excess caustic alkali.

Trisodium phosphate decahydrate was first prepared and described by Rammelsberg in Journ. für praktische Chem. vol. 94, page 237 (1864). He obtained it from the by-products of the concentration of caustic soda and describes it as colorless, transparent, octahedral crystals of the isometric system. Practically every handbook of inorganic chemistry, if it mentions this decahydrate at all, refers back to this original disclosure. I found, however, that very small amounts of the octahedral crystal of the decahydrate are contained in the commercial dodecahydrate and are easily distinguished, even when using an ordinary magnifying glass, from the rhombical elongated crystals of the dodecahydrate. The difference between the two is even more striking in a more or less weathered technical trisodium phosphate, where a few transparent, smooth-faced, octahedral crystals can be seen interspersed in a mass of white, rough and irregular crystal aggregates of more or less decomposed dodecahydrate.

While, so far as I am aware, no process has yet been described whereby this decahydrate can be prepared directly from trisodium phosphate solutions, the transition point between the dodeca and decahydrate has been given by Richards & Churchill in Zietschrift fur physikalische Chemie, vol. 28 (1889), page 314. They state that the dodecahydrate changes to the decahydrate at 73.4° C.

I have now found a process whereby this decahydrate, which heretofore has been a mere laboratory curiosity, can be produced technically and economically and made available to the trade.

This process consists substantially in heating a saturated trisodium phosphate dodecahydrate solution above its crystallizing temperature, seeding the solution with decahydrate crystals, allowing the decahydrate to crystallize out and continuously removing this hydrate from the crystallizing liquor.

It is well known that the saturation point of trisodium phosphate dodecahydrate solution is greatly influenced by the presence of free caustic alkali in the solution, i. e., the free caustic raises the temperature at which crystallization sets in, or, in other words, decreases the solubility of the dodecahydrate. This has to be taken into consideration when determining the temperature at which, according to my novel process, the decahydrate can be obtained.

An apparatus very conveniently adapted for performing this process is described in U. S. Patent 1,559,703, dated November 3, 1925, to H. Howard. The crystallizing solution in this apparatus circulates upward through a crystallizing vessel of progressively increasing cross-sectional area, the crystals formed, as soon as they have grown to a certain size, separate by gravity and are removed through a trap at the lowermost end of the crystallizing vessel; the mother liquor overflows at the top, is strengthened up to the desired concentration, adjusted to the proper temperature and returns to the bottom of the crystallizing vessel.

In using the above apparatus for performing my invention, I prepare a solution of trisodium phosphate saturated in respect to the dodecahydrate, heat same a few degrees above its crystallizing temperature, circulate this through the crystallizing vessel and add therein a few crystals of the decahydrate; these grow and new seed crystals are formed; the large octahedral crystals fall in the trap and are removed. The temperature is maintained above the crystallizing temperature of the dodecahydrate in the circulating liquor. This is periodically strengthened by additions of trisodium phosphate dodecahydrate which will dissolve immediately. No further addition of seed crystal is required after the separation of the decahydrate has started, inasmuch as sufficient crystals remain suspended in the circulating liquor within the crystallizing vessel. If no pure decahydrate is available at the beginning of the operation, it is sufficient to add to the circulating liquor some technical dodecahydrate, which, by a visual examination, has been shown to contain a few decahydrate octahedrons; the dodecahydrate crystals will quickly dissolve whereas the octahedrons will remain and induce crystallization.

The following table gives detailed conditions in the crystallizing apparatus under which trisodium phosphate decahydrate has been obtained by me in performing my invention:

| Composition of the circulating liquor. | | Degree Baumé at operating temperature. | Cryst. temp. of the dodecahydrate in this liquor in °F. | Temp. maintained in crystallizer. °F. |
|---|---|---|---|---|
| % dodecahydrate. | % free caustic. | | | |
| 50.0 | 0.75 | 32 | 126 | 130 |
| 53.5 | 1.3 | 33 | 137 | 140 |
| 55.3 | 1.46 | 34 | 141 | Slightly above 141. |
| 45.4 | 0.83 | 27.5 | 120 | 126 |
| 47.6 | 0.85 | 28 | 124 | 126 |

The product obtained in these crystallization runs consisted practically exclusively of transparent, very regular, smooth-faced, octahedral crystals. These crystals are not materially changed when stored under normal conditions; they retain their well developed crystal form and show no tendency to cake. Analysis of the product shows absence of free caustic and a content of 99.0% of $Na_3PO_4.10H_2O$.

While the above describes the production of trisodium phosphate decahydrate in connection with the crystallizing apparatus disclosed in the above cited U. S. Letters Patent 1,559,703, I wish it understood that my invention is not limited to the use of this type of crystallizer. It is only essential that the crystallizing liquor be maintained at a temperature above the crystallizing temperature of a dodecahydrate solution of that same composition. The crystallizing speed of the decahydrate is considerably less than that of the dodecahydrate and if crystallization is not induced by seeding with this particular product, crystallization might not proceed at all.

The most efficient temperature range at which I can produce the decahydrate is between 120 and 145° F., i. e., below the transition point between the dodeca and decahydrate. Trisodium phosphate liquors measuring between 27 and 35° Bé. at the above temperatures are of the most convenient concentration for performing my novel process, and I also prefer to keep the free caustic content of the liquor at a reasonably low percentage, say, less than 2 or 3%.

I claim:

1. Process of producing crystallized trisodium phosphate decahydrate which comprises heating an aqueous saturated trisodium phosphate dodecahydrate solution above its crystallization temperature, seeding the liquor with decahydrate crystals, and removing the decahydrate crystals formed.

2. Process of producing non-caking, smooth-faced trisodium phosphate hydrate crystals which comprises heating the trisodium phosphate solutions of a concentration varying between 27 and 35° Bé. to a temperature within the range of 120 to 145° F., and under conditions where the solution is undersaturated in respect to trisodium phosphate dodecahydrate, and recovering the trisodium phosphate hydrate crystals formed.

3. Process of producing non-caking, smooth-faced trisodium phosphate hydrate crystals which comprises circulating an aqueous trisodium phosphate solution, undersaturated in respect to trisodium phosphate dodecahydrate, at a temperature above 120° F. and a concentration above 27° Bé., upward through a crystallizing vessel, allowing the trisodium phosphate hydrate crystals formed to separate by gravity, strengthening the mother liquor up to the original concentration by the addition of trisodium phosphate thereto, and returning the concentrated solution to the crystallizing vessel.

In testimony whereof, I affix my signature.

LEON R. WESTBROOK.